United States Patent [19]

Kravetz

[11] Patent Number: 4,795,254
[45] Date of Patent: Jan. 3, 1989

[54] DURABLE WORKING MATTE/GLOSSY COLOR STANDARD AND METHOD OF MAKING SAME

[75] Inventor: Alan G. Kravetz, New Windsor, N.Y.

[73] Assignee: Kollmorgen Corporation, Simsbury, Conn.

[21] Appl. No.: 66,859

[22] Filed: Jun. 25, 1987

[51] Int. Cl.⁴ .............................. G01J 3/46; G01J 3/52
[52] U.S. Cl. ...................................................... 356/243
[58] Field of Search ...................... 356/243; 250/252.1

[56] References Cited

U.S. PATENT DOCUMENTS 1,649,964 11/1927 Little .
2,094,158  3/1937 Luckiesh .
2,882,415  4/1959 Pressau .
4,059,357 11/1977 Klein .
4,422,759 12/1983 Holman et al. ...................... 356/243

OTHER PUBLICATIONS

Erb "Requirements for Relection Standards and the Measurement of Their Reflection Values," J. Applied Optics, vol. 14, No. 2, pp. 493–499 (Feb. 1975).
Judd and Wyszecki, *Color in Business, Science and Industry*, John Wiley & Sons (3d Edition 1975) pp. 248–253.

Primary Examiner—Vincent P. McGraw
Assistant Examiner—S. A. Turner
Attorney, Agent, or Firm—Morgan & Finnegan

[57] ABSTRACT

A color reference standard and method of making same are disclosed. A transparent film having a matte surface and a spectral optical modulator are selected. The spectral optical modulator, preferably a glossy pigment, is coated onto the film surface opposite the matte surface, as by painting, hand drawn down, or silk screen application. So configured, the color reference standard provides a matte color reference standard when the glossy pigment coating is viewed through the matte film surface and a glossy reference standard when the glossy pigment is viewed directly from the opposite side of the reference standard. Advantageously, both the matte and glossy reference surfaces are cleanable without altering the reflectance values of the color standard.

21 Claims, 1 Drawing Sheet

DURABLE WORKING MATTE/GLOSSY COLOR STANDARD AND METHOD OF MAKING SAME

TECHNICAL FIELD

The present invention relates to reflection standards and, more particularly, to a working color standard having matte and glossy surface areas.

BACKGROUND AND OBJECTS OF THE INVENTION

Standardized color measurement is very important in a wide variety of applications, ranging from quality control to chemical analysis. In addition, some instruments provide relative color measurements by comparing the target to a known standard. Consequently, reliable color measurements require periodic calibration of any given instrument for reflection measurement using a working color standard. General properties of reflection standards are discussed in Erb, "Requirements for Reflection Standards and the Measurement of their Reflection Value", *J. Applied Optics*, Vol. 14, No. 2, February 1975.

Two types of color standard are commonly used; a glossy standard and a matte standard. Advantageously, a glossy standard includes a glossy surface having a protective layer which desirably protects the standard and permits the standard to be cleaned without impairing the properties of the glossy surface. Unfortunately, however, specular reflections occur with a glossy standard due to the hard protective layer. The specular reflections can affect the measured value obtained and, therefore, a diffuse matte color standard is often preferred, if not required, for any given application.

Heretofore known matte reflection standards have been made by applying a matte pigment to a substrate. The reflectance of the matte pigment is directly measured from that surface One such matte color standard is discussed in *Color in Business, Science and Industry*, Judd and Wyszecki, John Wiley & Sons, Inc., 250 (3d Ed. 1975). There, Judd and Wyszecki disclose color chips prepared by applying a pigmented matte film to a clear cellulose acetate base. The pigmented film side constitutes the matte side of the standard and the same matte coating serves as a glossy color standard when viewed through the clear, transparent acetate.

Unfortunately, matte pigment surfaces are subject to contamination since there is no hard protective layer, as there is in the case of a glossy finish. To the contrary, the matte pigment particles are located at the exposed surface and are subject to wear. Since a working standard is handled frequently during ordinary use, contamination gradually accumulates on a matte pigment surface and alters the reflections of the standard. As a further disadvantage, attempts to clean the surface of the unprotected matte finish result in a phenomenon known as polishing. That is, as the matte surface is cleaned it is gradually buffed and smoothed, thereby changing the reflectance of the surface. Thus, depending upon the care of the user matte standards can degrade dramatically and cannot be adequately and/or reliably cleaned in order to restore the standard to its original reflectance.

Therefore, it is one object of the present invention to provide a color reflection standard.

Another object of the present invention is to provide a matte reflectance color standard that is less susceptible to contamination and which can be cleaned without impairing the value of the matte surface as a reflection standard.

Yet another object of the present invention is to provide a matte reflectance color standard that is not susceptible to the effects of polishing.

Another object of the present invention is to provide a convenient matte and glossy reflection standard having matte and glossy surfaces which are less susceptible to contamination and which can be cleaned without polishing effects.

These and other highly desirable and unusual results are accomplished by the present invention in a convenient, contamination-resistant, cleanable working color standard.

Objects and advantages of the invention are set forth in part herein and in part will be obvious herefrom, or may be learned by practice with the invention, which is realized and attained by means of the instrumentalities and combinations pointed out in the appended claims.

The invention consists of the novel parts, constructions, arrangements, combinations, steps, and improvements herein shown and described.

SUMMARY OF THE INVENTION

In accordance with the present invention a durable, cleanable matte color standard and method of making the same are provided. Advantageously, the color standard according to the present invention also provides a glossy standard. As used herein, the term "color" should not be construed as limited to reflected light in any particular region of the visible spectrum, but includes any reflected radiation which needs to be measured.

In the preferred embodiment and method of the invention the substrate of the working color standard is selected to be a transparent film, such as a polyester film, having a matte finish on one side. An appropriate spectral optical modulator is selected which will provide the desired color and reflectance value. Preferably, the spectral optical modulator is a glossy pigment, such as a durable glossy paint. The pigment is coated onto the non-matte or glossy side of the film opposite to the matte side using any appropriate coating method, such as painting or a hand draw-down method of application. So configured, the standard presents a matte appearance when the pigment is viewed through the matte side of the film and a glossy appearance when the glossy pigment is viewed directly from the opposite side of the color standard.

The working color standard according to the present invention remarkably obtains a working matte and glossy color standard without any exposed surface of matte pigment. Instead, a glossy paint is used and is rendered matte when viewed through the transparent film. Consequently, the matte surface of the standard according to the present invention is much less susceptible to contamination and can readily be cleaned without danger that the reflectance of the standard will be altered. As will also be readily appreciated, the glossy paint side of the color standard can also readily be cleaned without altering the reflectance of the working color standard. These remarkable results simply cannot be attained with heretofore known matte and glossy working standards wherein matte pigment surfaces are exposed and subject to damage.

Thus, the present invention obtains a working color standard having both matte and glossy reference surfaces which can be handled with confidence and can conveniently be cleaned, when necessary, without altering the reflectance of the standard Yet these remarkable results are obtained with relatively inexpensive raw materials in a straightforward method of manufacture, so the advantages of the present invention may be applied to any application where color reference standards are or can be used.

It will be understood that the foregoing general description and the following detailed description as well are exemplary and explanatory of the invention but are not restrictive thereof.

BRIEF DESCRIPTION OF THE DRAWINGS

The accompanying drawings, referred to herein and constituting a part hereof, illustrate the preferred embodiments of the product of the present invention, and together with the description serve to explain the principles of the invention, in which.

DETAILED DESCRIPTION OF THE PREFERRED EMBODIMENTS

Figure 1:
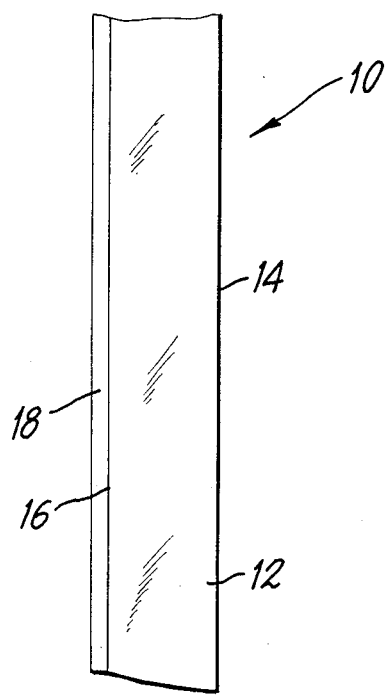
FIG. 1 is a cross-section view of a color standard in accordance with the present invention.

Referring now to the drawings, a working color standard 10 in accordance with the present invention is shown in which a transparent film 12 has a matte side 14 and a non-matte or glossy side 16, the latter side bearing a spectral optical modulator 18. Thus configured, the spectral optical modulator presents a matte color reference standard when viewed through matte side 14 of transparent film 12 and a glossy color reference standard when viewed directly from the opposite side of the film.

Film 12 may be any transparent film having a matte surface 14. It has been found that a polyester film having one matte side, such as a one matte side polyester film available in roll or sheet form from E.I. DuPont de Nemoirs & Co. under the designation "Mylar," is particularly appropriate. As available from DuPont, one matte side Mylar film has a milky appearance when viewed from the matte side.

Spectral optical modulator 18 is preferably a pigmented coating. Alternatively, spectral modulator 18 may be a dye or interference pattern applied in any appropriate fashion. For convenience, the discussion below will refer to and discuss spectral optical modulator as a pigment coating.

Pigment coating 18 may be any appropriate pigment which provides the desired reflectance value when viewed through matte side 14 of film 12. Preferably, the pigment is a glossy paint, such as a durable automotive grade glossy paint. The pigment is chosen in a known manner according to the desired reflectance standard. For example, should a white matte calibration standard be desired having a particular reflectance value, a white paint is selected so that an appropriate matte reflectance value is obtained when the reflectance of the white paint is measured through matte side 14 of film 12. Should a different color standard be required, an appropriate color paint is selected to provide the desired matte reflectance. It should also be noted that the reference standard according to the present invention may be constructed to provide gray tones by choosing an appropriate pigment.

Figure 2A:
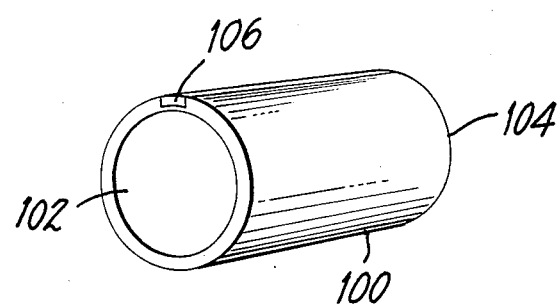
FIG. 2A is a perspective view of a cannister-type calibration standard embodying the invention.
Figure 2B:
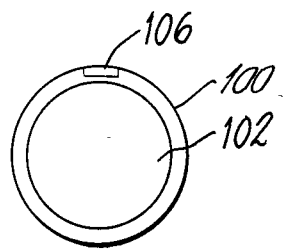
FIG. 2B is an end view of the cannister-type calibration standard of FIG. 2A, showing a white standardization surface.
Figure 2C:
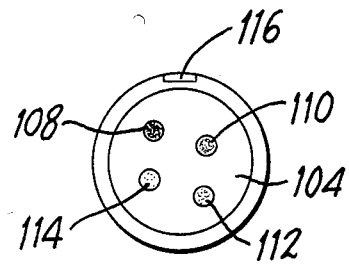
FIG. 2C is an opposite end view of the cannister-type calibration standard of FIGS. 2A and 2B, showing a calibration surface having four gray-tone dot areas.

By way of specific example, FIGS. 2A–C show a calibration standard in accordance with the present invention constructed to provide both a white reference surface and a second reference surface having multiple regions of different gray tones. FIG. 2A shows a cannister body 100 which is particularly useful for handling the reference standard without touching the reference surfaces 102, 104 exposed at either end of the cannister. FIG. 2B, an end view of cannister 100 looking toward reference 102, shows a white standardization surface 102 constructed in accordance with the invention. Alignment tab 106 assures consistent alignment of the reference surface when cannister 100 is inserted into the instrument. FIG. 2C, an end view of cannister 100 looking toward reference surface 104 having four dot regions 108, 110, 112, 114 of different gray tones. Once again, an alignment tab 116 assures consistent positioning of the reference surface when the cannister is inserted into the instrument. By way of example, a reference surface such as shown at 104 might be used with an instrument constructed to observe several distinct regions of a target surface, such as in chemical analysis. In use, cannister 100 is first inserted into the instrument for reading white reference surface 102 with alignment tab 106 engaging a slot in the instrument reading port. After standardizing the instrument by reading the white surface, the cannister is removed from the instrument and reversed in order to insert calibration surface 104 into the reading port. Alignment tab 116 engages the slot in the instrument to assure proper positioning of dot regions 108, 110, 112, 114 for reading. After calibration in this manner the instrument is ready for use in analyzing samples.

The method of manufacturing the reference standard according to the present invention includes the steps of selecting a transparent film having a matte surface, selecting an appropriate pigment which will yield the desired reflectance value when viewed through the matte surface of the film, and coating the pigment onto the glossy film surface opposite to the matte surface. The coating step may be accomplished using any suitable coating process, including but not limited to painting, hand draw down application, silk screening, casting or sputter coating.

In use, the reference standard according to the present invention is used to calibrate or standardize instrumentation, such as a reflectance photometer. The user inserts the reference standard according to the invention into the reading stand of the instrument and activates the instrument to read and, where appropriate, record the reflectance reading obtained. For example, a white standard having a high reflectance on the order of 83% when viewed through the matte surface of the film might be used to standardize an instrument. In addition or in the alternative, a non-white reference, such as a color standard, could be made and used to calibrate non-white readings. Subsequent instrument sample readings can then be compared to the reference reading to ensure accurate sample measurements.

Although it is contemplated that most calibration measurements would be made with the matte side of the reference standard it is also contemplated that, where appropriate, the reference standard could be turned over and a reference reading could be taken directly from the glossy pigment.

As will be readily appreciated, during use the reference standard is handled regularly and dirt and/or other contamination may accumulate on the reference surfaces. Advantageously, however, both the matte and glossy surfaces of the reference standard according to the invention can readily be cleaned without affecting the reflectance properties of the standard. This remarkable property is the direct result of the novel configuration of the present standard in which a cleanable matte film is the only exposed surface on the matte side and a durable glossy paint is the only exposed surface on the glossy side of the standard.

To the extent not already indicated, it also will be understood by those of ordinary skill in the art that any one of the various specific embodiments herein described and illustrated may be further modified to incorporate features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

What is claimed is:

1. A working color reference standard comprising:
   a transparent film substrate having a first, matte surface and a second surface;
   a glossy pigmented coating covering at least a portion of said second surface, said glossy pigmented coating providing a matte reference standard when viewed through said transparent film from the first, matte surface side of said transparent film and a glossy reference standard when said second side of said transparent file covered with said glossy pigmented coating is viewed directly.

2. The color reference standard according to claim 1, wherein said transparent film substrate further comprises a polyester film having one matte side corresponding to said first matte surface, said polyester film also having a glossy surface opposite said matte surface corresponding to said second surface.

3. The color reference standard according to claim 1 wherein said gloss pigmented coating further comprises a glossy paint, said gloss paint providing a glossy color reference when said second side of said transparent film coated with said glossy paint is viewed directly.

4. The color reference standard according to claim 3 wherein said glossy paint is white.

5. The color reference standard according to claim 3 wherein said glossy paint is gray.

6. The color reference standard according to claim 3 wherein said pigmented coating means covers multiple dot regions of said second surface.

7. The color reference standard according to claim 1 wherein said glossy pigmented coating covers multiple dot regions of said second surface.

8. The color reference standard according to claim 8 wherein said multiple dot regions constitute a series of gray tones.

9. The color reference standard according to claim 3 wherein said glossy paint further comprises a durable, automotive grade glossy paint.

10. The color reference standard according to claim 1 wherein said glossy pigmented coating further comprises a dye.

11. The color reference standard according to claim 1 wherein said glossy pigmented coating further comprises an interference pattern.

12. A method of making a working color standard comprising the steps of:
    selecting a transparent substrate having a first matte surface and a second surface;
    selecting a glossy pigmented coating;
    coating said second surface of said transparent substrate with said glossy pigmented coating, thereby providing a matte reference standard when said glossy pigmented coating is viewed through said transparent substrate from said first, matte surface side of said substrate, and a glossy color reference standard when the second side of the substrate coated with said glossy pigmented coating is viewed directly.

13. The method according to claim 12 wherein said glossy pigmented coating further comprises an opaque pigmented material.

14. The method according to claim 12 wherein said opaque pigmented material is a glossy paint.

15. The method according to claim 14 wherein said glossy paint is coated onto said second surface by painting.

16. The method according to claim 13 wherein said coating step further comprises a hand draw down operation.

17. The method according to claim 13 wherein said transparent substrate is a polyester film having a matte side.

18. The method according to claim 15 wherein said glossy pigmented coating means is painted onto said second surface to form distinct dot regions.

19. The method according to claim 14 wherein said glossy paint is a durable, automotive grade glossy paint.

20. The method according to claim 12 wherein said glossy pigmented coating further comprises a dye.

21. The method according to claim 12 wherein said glossy pigmented coating further comprises an interference pattern.

* * * * *

UNITED STATES PATENT AND TRADEMARK OFFICE
CERTIFICATE OF CORRECTION

PATENT NO. : 4,795,254

DATED : January 3, 1989

INVENTOR(S) : Alan G. Kravetz

It is certified that error appears in the above-identified patent and that said Letters Patent is hereby corrected as shown below:

Column 1, line 38, after "surface" insert --.--

Column 3, line 3, after "standard" insert --.--

Column 5, line 49, "gloss" should read --glossy--

Column 6, line 7, "claim 8" should read --claim 7--

Column 6, line 36, "claim 12" should read --claim 13--

Signed and Sealed this

Second Day of May, 1989

Attest:

DONALD J. QUIGG

Attesting Officer

Commissioner of Patents and Trademarks